UNITED STATES PATENT OFFICE 2,556,150

BUTYL ALCOHOL DERIVATIVES

Richard B. Wearn and Carl Bordenca, Birmingham, Ala., assignors to Food Machinery and Chemical Corporation, a corporation of Delaware No Drawing. Application December 26, 1946, Serial No. 718,609

5 Claims. (Cl. 260—488)

This invention is related to a new class of butyl alcohol derivatives and more particularly refers to alkyl-cyclohexenyl butanols, alkyl-cyclohexyl butanols, and their esters.

It is an object of this invention to produce a new class of compounds having sweet, persistent odors which permit their use as components of perfumes and related products. A further object is to produce by a simple and inexpensive process beta - (4 - methyl - $\Delta^3$ - cyclohexenyl) - butanol, beta-(4-methyl-cyclohexyl)-butanol, and esters thereof. Additional objects will become apparent from a consideration of the following specification and claims.

These objects are attained in accordance with the present invention by reducing beta-(4-methyl-$\Delta^3$-cyclohexenyl)-butyraldehyde or beta-(4 - methyl - cyclohexyl) - butyraldehyde. The foregoing aldehydes may be prepared by reacting limonene or dipentene with carbon monoxide and hydrogen in the presence of Raney cobalt at temperatures within the range of 130–175° C. and pressures from 1000 to 5000 pounds per square inch for from ½ hour to 10 hours. This latter process is described in more detail in copending application Serial No. 685,241, filed July 20, 1946, by Lazier and Bordenca. The resulting alcohols may be employed as such or may be converted to fatty acid esters by treatment with sodium acetate or related fatty acid esterifying agents. By an alternative method, such of the foregoing alcohols as contain a cyclohexyl ring structure may be produced from the corresponding alcohols containing a cyclohexenyl ring structure by direct reduction of the latter.

This invention may be more readily understood by a consideration of the following illustrative examples:

Example 1

A solution of 550 grams of technical aluminum isopropoxide in three liters of isopropyl alcohol was prepared. To this was added 450 grams of dextrorotatory beta - (4 - methyl - $\Delta^3$ - cyclohexenyl)-butyraldehyde, which was prepared from dextrorotatory limonene through reaction with hydrogen and carbon monoxide, in accordance with the process described in copending application Serial No. 685,241, filed July 20, 1946, by Lazier and Bordenca. The mixture was refluxed for three hours, and then approximately two-thirds of the solvent was removed by distillation. The residue was poured into a mixture of ice and dilute hydrochloric acid. The oil which separated was washed well with water, dried over anhydrous calcium sulfate, and distilled. There was obtained 337 grams (75 percent yield) of dextrorotatory beta-(4-methyl-$\Delta^3$-cyclohexenyl)-butanol, B. P. 92° C./1–3 mm.

Physical constants: $n_D^{30}$ 1.4847, $[\alpha]_D^{30} +33°$, d. $_{25°}$ 0.946.

Analysis of substituted butanol: Calculated for $C_{11}H_{20}O$: C, 78.50%; H, 11.98%. Found: C, 77.80%; H, 11.95%.

Example 2

By substituting levorotatory beta-(4-methyl-$\Delta^3$-cyclohexenyl)-butyraldehyde (derived in the same manner from l-limonene) as a starting material in Example 1, levorotatory beta-(4-methyl-$\Delta^3$-cyclohexenyl)-butanol was obtained.

Physical constants: B. P. 85–87°/1–2 mm., $n_D^{30}$ 1.4846, $[\alpha]_D^{30} -57°$.

Example 3

A high-pressure catalytic apparatus of 685 cc. capacity was charged with 100 grams of beta-(4-methyl-$\Delta^3$-cyclohexenyl)-butyraldehyde (see Example 1) and 4 grams of nickel-on-kieselguhr catalyst powder. Hydrogen was introduced to a pressure of 1,330 p. s. i. (26° C.), and the bomb was agitated and heated at 120–140° C. for 3½ hours, during which time the pressure drop to 650 p. s. i. (26° C.) indicated that approximately two moles of hydrogen had been absorbed for each mole of the aldehyde. The bomb was then cooled and the product removed, filtered, and distilled. The product, beta-(4-methyl-cyclohexyl)-butanol, weighed 89 grams (87 percent yield).

Physical constants: B. P. 91° C./2–3 mm., $n_D^{30}$ 1.4684.

Analysis: Calculated for $C_{11}H_{22}O$: C, 77.58%; H, 13.02%. Found: C, 77.12%; H. 12.50%.

Example 4

A high-pressure hydrogenation apparatus of 685 cc. capacity was charged with 75 grams of dextrorotatory beta - (4 - methyl - $\Delta^3$ - cyclohexenyl)-butanol (made by Example 1) and 5 grams of nickel-on-kieselguhr. Hydrogen was added to 1,600 p. s. i. (26° C.) and the material was reduced at 150–170° C. for 2 hours. After cooling, the product was removed from the bomb, filtered, and distilled. There was obtained 70 grams (92 percent yield) of beta - (4 - methyl - cyclohexyl)-butanol.

Physical constants: B. P. 80–82° C./1–2 mm.; $n_D^{30}$ 1.4690.

Example 5

A mixture of 10 grams of dextrorotatory beta-(4 - methyl - Δ³ - cyclohexenyl) - butanol, 2.2 grams of anhydrous sodium acetate, 6.5 grams of acetic anhydride, and 30 cc. of anhydrous benzene was refluxed for 3 hours. It was then poured into water and the benzene layer washed successively with 5 percent sodium hydroxide, 2 percent hydrochloric acid, and water. Upon distillation, 11 grams (88 percent yield) of dextrorotatory beta - (4 - methyl - Δ³ - cyclohexenyl) - butyl acetate was obtained.

Physical constants: B. P. 89°/1–3 mm., $n_D^{30}$ 1.4684, $[\alpha]_D^{30}$ +30.

Analysis: Calculated for $C_{13}H_{22}O_2$: C, 74.24%; H, 10.54%. Found: C, 74.47%; H, 10.41%.

Example 6

By the same procedure of esterification as Example 5, 51 grams of beta-(4-methyl-cyclohexyl)-butanol was converted into beta-(4-methylcyclohexyl)-butyl acetate.

Yield 53.5 grams (93 percent), B. P. 75°/1–3 mm., $n_D^{30}$ 1.4553.

Analysis: Calculated for $C_{13}H_{24}O_2$: C, 73.54%; H, 11.39%. Found: C, 72.90%; H, 10.84%.

It is to be understood that the foregoing examples are merely explanatory of the present invention and are not to be considered as a limitation thereon. The various reactants referred to in these examples, the proportions thereof, and the conditions of reaction may be varied widely without departing from the scope of this invention.

For instance, in place of the butyraldehyde derivatives described in the examples, it is contemplated that other butyraldehyde derivatives may be employed. In such derivatives the methyl group para to the butyraldehyde group may be replaced by other substituents, for example, the ethyl, propyl, isopropyl, etc., radicals. In the same manner it is contemplated that other partially or completely hydrogenated benzene derivatives may be employed in place of the cyclohexyl and cyclohexenyl derivatives mentioned.

When these compounds are reduced, in accordance with this invention, the resulting product has a carbinol group substituted for the aldehyde group of the parent compound. Further, if the reduction reaction is vigorous or is prolonged any unsaturated bond in the ring is removed to form the corresponding cyclohexyl derivative. A mild reducing agent which permits conversion to the alcohol without saturating the ring compound is aluminum isopropoxide, as well as related agents of a similar nature. For the more vigorous type of reduction wherein the alcohol is produced and at the same time the ring group is saturated, it is advisable to employ catalytic hydrogenation methods with catalysts such as nickel-on-kieselguhr or Raney nickel and generally a temperature within the range of 50–200° C. and a pressure within the range of 200–4000 pounds per square inch.

Where the ring group contains a double bond the resulting alcohol and its esters may be optically active, depending upon the optical activity, if any, of the parent aldehyde. Since the odor of the resulting compounds will vary somewhat depending upon the optical activity thereof, it is possible by following the instructions of this invention, to produce compounds having a wide range of odors.

Butyl alcohol derivatives produced as aforesaid may be employed as such or they may be esterified to produce compounds having additional desirable and persistent odors. Esterifying radicals are advisably derived from carboxylic acids, such as acetic acid, propionic acid, butyric acid, cyclopropane carboxylic acid, cyclohexane carboxylic acid, and similar fatty acids or alicyclic carboxylic acids.

By means of this invention a new class of butyl alcohols and their esters has been obtained. These compounds are of value as intermediates, and since they possess sweet, persistent odors which are pleasant to most individuals they are particularly adapted for use as components of perfumes.

As many apparently widely different embodiments of this invention may be made without departing from the spirit and scope hereof, it is to be understood that the invention is not limited to the specific embodiments hereof except as defined in the appended claims.

We claim:

1. A new class of compounds having the structure

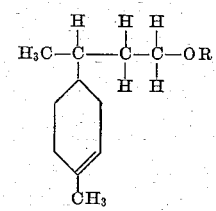

where R is selected from the class consisting of hydrogen, fatty acid and alicyclic carboxylic acid radicals.

2. Dextrorotatory beta-(4-methyl - Δ³ - cyclohexenyl)-butanol.

3. Dextrorotatory beta-(4-methyl-Δ³-cyclohexenyl)-butyl acetate.

4. Beta-(4-methyl-Δ³-cyclohexenyl)-butanol.

5. Fatty acid esters of beta-(4-methyl-Δ³-cyclohexenyl)-butanol.

RICHARD B. WEARN.
CARL BORDENCA.

REFERENCES CITED

The following references are of record in the file of this patent:

UNITED STATES PATENTS

| Number | Name | Date |
|---|---|---|
| 2,098,206 | Hartung et al. | Nov. 2, 1937 |
| 2,327,066 | Roelen | Aug. 17, 1943 |
| 2,394,848 | Doumani | Feb. 12, 1946 |
| 2,437,600 | Gresham et al. | Mar. 9, 1948 |

OTHER REFERENCES

Faucounau: Bull. Soc. Chim., vol. 4, 63–67 (1937).

Du Pont: Bull. Soc. Chim., vol. 6, 326–9 (1939).

Levene et al.: Chem. Abs., vol. 26, 5553 (1932).